Sept. 1, 1931.    F. E. McMULLEN    1,821,188
METHOD OF FINISHING GEARS
Filed June 28, 1929    2 Sheets-Sheet 2

Fig. 2

INVENTOR.
Frederick E. McMullen
BY
his ATTORNEY

Patented Sept. 1, 1931

1,821,188

UNITED STATES PATENT OFFICE

FREDERICK E. McMULLEN, OF ROCHESTER, NEW YORK, ASSIGNOR TO GLEASON WORKS, OF ROCHESTER, NEW YORK, A CORPORATION OF NEW YORK

METHOD OF FINISHING GEARS

Application filed June 28, 1929. Serial No. 374,543.

The present invention relates to the finishing of gears either by burnishing or lapping and particularly to the finishing of bevel gears. It may be considered as an improvement on the method described in the pending application of Alton P. Slade, Serial No. 296,562, filed July 31, 1928.

It is usual to burnish or lap high quality gears after they have been cut in order to remove flats, high-spots, tool marks, etc. and to secure a practical tooth bearing. Burnishing is effected before the gears are hardened and lapping is resorted to after hardening.

The purpose of the present invention is to provide a better and a faster method for finishing gears, such as bevel gears, which mesh with their axes angularly disposed and intersecting.

In the usual practice whether burnishing or lapping, it is customary to run together the pair of gears which are to mate. Now bevel gears mesh with a pure rolling action. On the other hand, when a pair of hypoid gears are running in mesh, there is in addition to the rolling motion a slight lengthwise sliding motion between the mating tooth surfaces. This is due to the fact that in a pair of hypoid gears the axis of the pinion is offset from the axis of the mating gear and where gears have their axes offset and angularly disposed to each other there is a relative sliding motion between the mating tooth surfaces.

When hypoid gears are in use, there is a distinct advantage to this feature of relative sliding for the relative sliding motion acts to distribute the lubricating oil film over the mating tooth surfaces and prevent wear. I have found, however, that this sliding motion characteristic of gears which mesh with angularly disposed offset axes can be used in a burnishing or lapping operation as a burnishing or lapping motion to produce wear and the purpose of burnishing or lapping is to wear away tooth surface imperfections. I propose, therefore, to burnish or lap gears, such as bevel gears, which mesh with intersecting axes, with finishing gears, such as hypoid gears, which will mesh in offset position with the gears to be burnished or lapped. Thus one or both members of a pair of bevel gears may be lapped or burnished but each will be lapped or burnished not by rolling it with its mate gear as in previous practise but by meshing it with a hypoid gear cut to mesh in offset position with the bevel gear.

I propose, therefore, to burnish a bevel gear with a hypoid gear which is conjugate to the bevel gear to be burnished by positioning the hypoid gear in engagement with the bevel gear so that its axis is offset from the axis of the bevel gear, meshing the two under pressure and, then, while holding them in meshed position through some suitable resilient means which permits a floating action, rotate the two gears together with the pinion acting preferably as the driver and simultaneously oscillate one of the gears about an axis parallel to and eccentric of its own axis. For lapping, the same motions are employed but the bevel and hypoid gears are not mounted so that one of them is free to float. In the lapping it is usual to apply pressure to the tooth surfaces by a manually operated brake which can be manipulated to apply any desired load. Either the burnishing or lapping operation can be effected on a machine such as described in the copending application above referred to.

In the present process, the sliding action between the gear being burnished or lapped and the hypoid finishing gear serves not only to accelerate the burnishing or lapping operation but eliminates the possibility of pitting at the pitch line which is ever present where gears mesh with a pure rolling motion. When burnishing or lapping a bevel gear with a bevel gear, great care must be taken not to continue the operation too long or pitting will occur, but where a bevel gear is lapped or burnished with a hypoid gear, the lapping or burnishing operation can proceed as long as desired without fear of pitting because of the feature of sliding mesh. Hence, the present invention affords not only a faster and better method of finishing gears but makes it possible to lap or burnish gears which it would be otherwise necessary to scrap.

In the drawings:

Figure 2 is a diagrammatic plan view further illustrative of the finishing operation;

Figure 1:
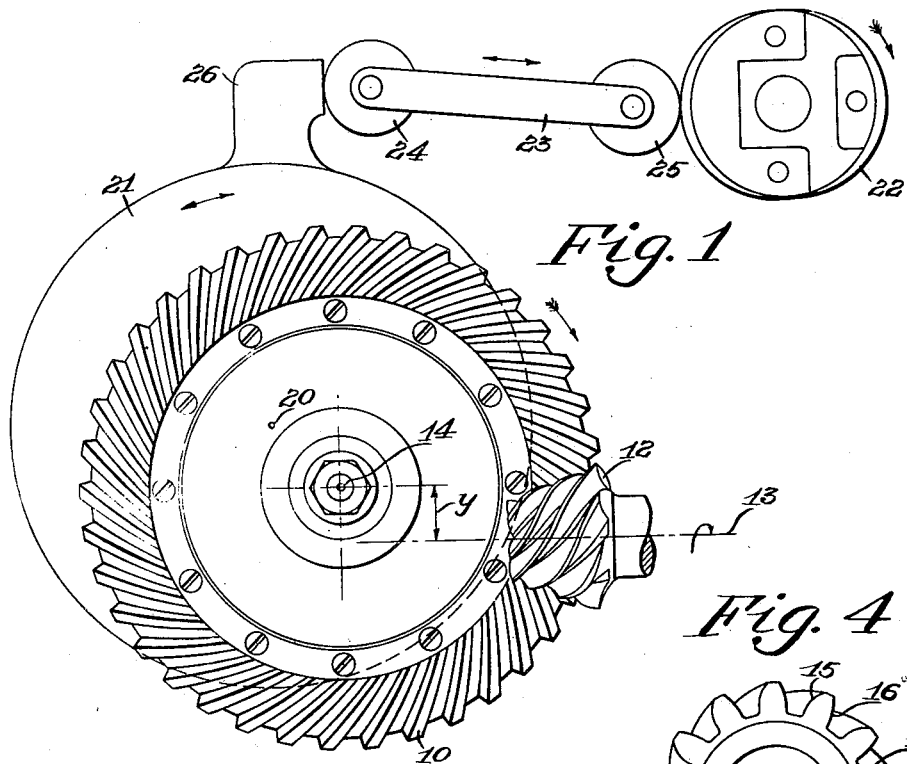
Figure 1 is a diagrammatic view illustrating the present invention and showing how it may be employed in conjunction with the lapping or burnishing of a spiral bevel gear by running it in mesh with a hypoid pinion.
Figure 4:
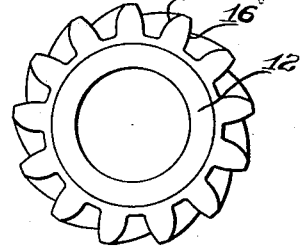
Figures 4 and 5 are end views of a correctly generated hypoid pinion and a spiral bevel pinion, respectively, showing the difference in profile curvature of the teeth of such gears.
Figure 3:
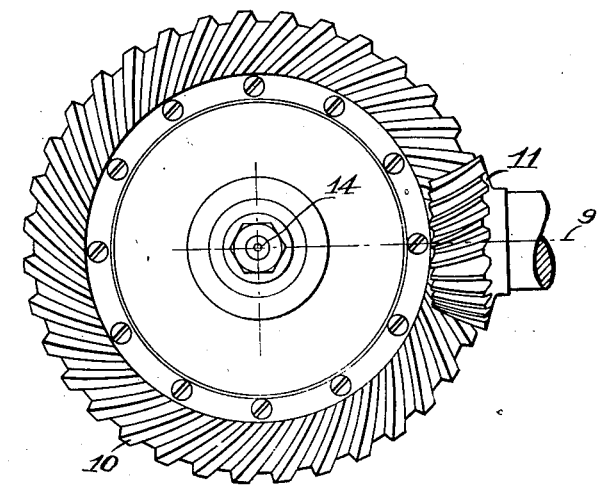
Figure 3 is a side elevation showing the bevel gear in mesh with its mating bevel pinion.
Figure 5:
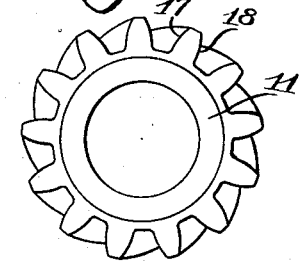

10 designates a spiral bevel gear. Such a gear in use meshes with its mating pinion, designated at 11, with its axis 14 angularly disposed to and intersecting the axis 9 of the pinion. As already described, it is proposed in the present invention to lap or burnish bevel gears, and that term is intended to include both gears and pinion, by running the bevel gear with a hypoid gear cut to mesh with the bevel gear with its axis angularly disposed to but offset from the axis of the bevel gear. Thus, to burnish or lap the spiral bevel gear 10, a hypoid pinion, such as shown at 12 will be used.

The hypoid pinion 12 meshes with the bevel gear 10 with its axis 13 offset from the axis 14 of the bevel gear 10 by the distance $y$ and the two axes 13 and 14 are preferably disposed to each other at the same angle as the angle between the bevel gear 10 and its mate pinion 11, in the present case a right angle.

To secure proper profile as well as lengthwise mesh between the tooth surfaces of the finishing pinion 12 and the spiral bevel gear 10 the finishing pinion is preferably generated according to the method of Patent No. 1,673,540, issued June 12, 1928 to Ernest Wildhaber. With the method of this patent, the pinion is generated in offset position so as to run correctly in offset position as required in the present invention. By the generating method described, tooth profiles will be produced on the pinion 12 which are unsymmetrical. Thus, the tooth profile indicated at 15 for one side of the pinion teeth is of greater curvature than the profile 16 of the opposite side of the pinion teeth. This contrasts with the structure of the bevel pinion 11 which mates with the bevel gear 10 and which has teeth of symmetrical profile curvature, the curvature of the profile 17 on one side of the teeth of the pinion 11 being similar to the curvature of the profile 18 of the opposite side of the teeth.

When the spiral bevel gear 10 to be burnished or lapped is run in mesh with the hypoid pinion 12, a relative sliding action will take place between the mating tooth surfaces of the gear 10 and the pinion 12. In carrying out the finishing operation, as the gears 10 and 12 rotate in mesh, the gear 10 is oscillated about an axis 20 which is parallel to but eccentric of its own axis 14. This may be accomplished by mounting the gear spindle in an eccentric 21 as in the machine of the application above referred to and oscillating the eccentric 21 by means of a cam 22 which rotates continuously in one direction on its axis and actuates the eccentric 21 through the connecting rod 23 and the rollers 24 and 25, one of which, 24, engages a projection 26 on the eccentric and the other of which, 25, engages the cam 22.

Figure 2 illustrates further how this invention may be practiced on the machine referred to, the outline of the machine being shown in dotted lines and the operating parts thereof in full. The hypoid pinion 12 is mounted on the pinion spindle 25 of the machine which is driven continuously during the lapping or burnishing operation by means of a pulley 26. The gear 10 to be lapped or burnished is secured to the gear spindle 27 of the machine and is rotated continuously during the lapping or burnishing operation by reason of its meshing engagement with the pinion 12. The gear spindle 27 is journaled in the eccentric drum 21, the axis of which is parallel to but eccentric of the axis of the gear spindle 27. The eccentric drum 21 is suitably mounted in bearings in the gear head 28 of the machine and is oscillated continuously during the operation of the machine by means of the cam 22, the rod 23, and the rollers 24 and 25 already referred to. The cam 27 is mounted on a cam shaft 30 which is driven continuously during the operation of the machine from the motor 31 through the spiral bevel gearing 32, 33 and the worm gearing 34, 35.

For lapping, the gear 10 and pinion 12 are brought into mesh and rotated in the presence of an abrasive mixture as is customary in lapping practice. Any desired load can be applied by a hand-brake. For burnishing, the gear 10 and pinion 12 are meshed under considerable pressure but are free to float. The mechanism by which the floating action is obtained will now be described. The pinion head 36 in which the pinion spindle 25 is journaled is adjustable to mesh the pinion 12 and gear 10 under pressure by rotation of the screw 37 which threads into a nut 38 that is secured to the pinion head 36 on the underside thereof. The screw 37 carries a collar 39 between which and the inside face of the frame of the machine is mounted a heavy coil spring 40. The screw shaft 37 is splined in the bracket or collar 41 by which it is mounted on the frame of the machine so that it is free to slide axially in the collar or bracket 41. Thus, although the pinion 12 and gear 10 are meshed under considerable pressure, the pinion is free to slide away from the gear 10 to avoid breakage if there is any irregularity in the teeth of gear or pinion. In the burnishing operation, of course, a suitable burnishing lubricant will be employed.

As will be seen, then, in finishing a bevel gear with the present invention there is a relative sliding motion between the bevel gear and the finishing gear due to the fact that the two mesh as hypoid gears, there is rotation of the gear to be finished and the finishing gear in mesh and there is oscillation of one gear about an axis parallel to and eccentric of its own axis. This last motion serves to produce a combined motion in the general direction of the teeth of one gear and in a direction transverse thereto.

While the present invention has been described specifically in connection with the lapping of a gear it is to be understood that the term "gear" is used broadly to cover both members of the pair and that a bevel pinion would be burnished or lapped according to the present invention by running it in mesh with a gear cut to mesh with it in offset position.

While the present invention has been described, moreover, in connection with the finishing of bevel gears, it will be understood that it applies generally to the finishing of gears which mesh with intersecting axes or, in fact, might be employed in the finishing of hypoid gears or pinions where it was desired to obtain a greater sliding action for burnishing or lapping than would be obtainable with the mating hypoid gear. In the latter case, a bevel gear cut to mesh in offset position with the hypoid gear to be lapped or burnished would be employed as the burnishing gear.

In general, it may be said that the present invention is capable of various modifications, adaptations, and uses and that this application is intended to cover any adaptations, uses, or embodiments of the present invention following, in general, the principles of the invention and including such departures from the present disclosure as come within known or customary practise in the gear art and as may be applied to the essential features hereinbefore set forth and as fall within the scope of the invention or the limits of the appended claims.

Having thus described my invention, what I claim is:

1. The method of finishing one of a pair of gears that mesh with angularly disposed intersecting axes, which consists in meshing the gear with a gear cut to mesh with said gear with its axis offset from and angularly disposed to the axis of said gear, rotating the two last named gears in mesh and simultaneously rotating one of said gears about an axis parallel to and eccentric of the axis of said gear.

2. The method of finishing a bevel gear which consists in meshing it with a tapered gear cut to mesh with said bevel gear with its axis offset from and angularly disposed to the axis of said bevel gear, rotating the two gears in mesh and simultaneously oscillating one of said gears about an axis parallel to and eccentric of the axis of said gear.

3. The method of finishing a bevel gear which consists in meshing it with a tapered gear which is generated to run with the bevel gear with its axis at right angles to, but offset from the axis of said bevel gear, rotating the two gears in mesh, and simultaneously oscillating one of said gears about an axis parallel to and eccentric of the axis of said gear.

4. The method of finishing a bevel gear which consists in meshing it with a gear having its axis offset from and angularly disposed to the axis of said bevel gear and having profiles differently curved on opposite sides of its teeth, rotating the two gears in mesh and simultaneously oscillating one of said gears about an axis parallel to and eccentric of the axis of said gear.

5. The method of finishing one of a pair of gears that mesh with their axes angularly disposed and intersecting, which consists in meshing it with a gear cut to mesh with the gear to be finished with its axis offset from and angularly disposed to the axis of said first named gear, rotating the two last named gears in mesh and simultaneously producing between them a reciprocating motion in the direction of the axis of one gear and a reciprocating motion transverse thereto.

6. The method of finishing a bevel gear which consists in meshing it with a tapered gear cut to mesh with said bevel gear, its axis offset from and angularly disposed to the axis of said bevel gear, rotating the two gears in mesh and simultaneously producing between them a reciprocating motion in the direction of the axis of one gear and a reciprocating motion transverse thereto.

7. The method of finishing a bevel gear which consists in meshing it with a tapered gear cut to mesh with said bevel gear, its axis offset from and angularly disposed to the axis of said bevel gear, rotating the two gears in mesh and simultaneously producing between them a combined motion in the general direction of the teeth of one gear and in a direction transverse thereto.

8. The method of finishing one of a pair of gears that mesh with their axes intersecting and angularly disposed to each other, which consists in selecting a gear adapted to mesh with said gear with its axis offset from and angularly disposed to the axis of said gear, bringing the two last named gears into mesh under considerable pressure and while holding said gears in said position resiliently, rotating the two gears together and simultaneously rotating one of said gears about an axis parallel to and eccentric of its own axis.

9. The method of finishing a bevel gear which consists in selecting a tapered gear adapted to mesh with said bevel gear with its axis offset from and angularly disposed to the axis of the bevel gear, bringing the two gears into mesh under considerable pressure and, while holding said gears in said position resiliently, rotating the two gears together and simultaneously oscillating one of said gears about an axis parallel to and eccentric of its own axis.

10. The method of finishing a bevel gear which consists in selecting a tapered gear generated to mesh with said bevel gear with its axis offset from and at right angles to the axis of the bevel gear, bringing the two gears into mesh under considerable pressure, and, while holding said gears in said position resiliently, rotating the two gears together and simultaneously oscillating one of said gears about an axis parallel to and eccentric of its own axis.

11. The method of finishing a bevel gear which consists in selecting a tapered gear adapted to mesh with said bevel gear with its axis offset from and angularly disposed to the axis of said bevel gear and having its profiles differently curved on opposite sides of its teeth, bringing the two gears into mesh under considerable pressure and, while holding said gears in said position resiliently, rotating the two gears together and simultaneously oscillating one of said gears about an axis parallel to and eccentric of its own axis.

12. The method of finishing a bevel gear which consists in meshing it under considerable pressure with a hypoid gear and, while holding said gears in mesh resiliently, rotating the two gears together and simultaneously oscillating the bevel gear about an axis parallel to and eccentric of its own axis.

13. The method of finishing a bevel gear which comprises selecting a tapered gear cut to mesh with said bevel gear with its axis offset from and angularly disposed to the axis of said bevel gear, bringing the two gears into mesh under considerable pressure and, while holding said gears in mesh resiliently, rotating the two gears together.

FREDERICK E. McMULLEN.